United States Patent [19]

Gruner

[11] 3,737,866

[45] June 5, 1973

[54] DATA STORAGE AND RETRIEVAL SYSTEM

[75] Inventor: Ronald H. Gruner, Framingham, Mass.

[73] Assignee: Data General Corporation, Southboro, Mass.

[22] Filed: July 27, 1971

[21] Appl. No.: 166,508

[52] U.S. Cl. ........ 340/172.5

[51] Int. Cl. ........ G06f 9/10

[58] Field of Search ........ 340/172.5, 146.2; 235/153

[56] References Cited

UNITED STATES PATENTS

| | | | |
|---|---|---|---|
| 3,460,094 | 8/1969 | Pryor | 340/172.5 |
| 3,629,842 | 12/1971 | Taylor | 340/172.5 |
| 3,517,174 | 6/1970 | Ossfeldt | 340/172.5 |
| 3,641,511 | 2/1972 | Cricchi et al. | 340/173 R |
| 3,339,183 | 8/1967 | Bock | 340/172.5 |
| 3,343,140 | 9/1967 | Richmond et al. | 340/172.5 |
| 3,473,160 | 10/1969 | Wahlstrom | 340/172.5 |
| 3,579,201 | 5/1971 | Langley | 340/172.5 |
| 3,597,641 | 8/1971 | Ayres | 307/242 |
| 3,629,853 | 12/1971 | Newton | 340/172.5 |

*Primary Examiner*—Gareth D. Shaw
*Assistant Examiner*—John P. Vanderberg
*Attorney*—Sewall P. Bronstein, John D. Woodberry, Robert F. O'Connell et al.

[57] ABSTRACT

A data storage and retrieval system which in a preferred embodiment thereof uses at least two integrated circuit units each having a plurality of storage registers and appropriate data access and data insertion means thereon. The same data is stored in corresponding storage registers in each integrated circuit unit so that simultaneous access can be obtained to data in two or more storage devices for supplying such data simultaneously to a data processing unit. Data received from a data processing unit can also be simultaneously stored in appropriately corresponding data registers of each integrated circuit unit.

9 Claims, 4 Drawing Figures

DATA STORAGE AND RETRIEVAL SYSTEM

INTRODUCTION

This invention relates generally to data storage and retrieval means for use in data processing systems and, more particularly, to data storage and retrieval means which permit simultaneous access to data stored in two or more storage devices therein.

BACKGROUND OF THE INVENTION

In data storage and retrieval apparatus used in data processing systems, it is often necessary or desirable to obtain simultaneous access to more than one storage device, such as a storage register, so as to supply the data stored therein simultaneously to a computation, or other data processing, unit. For example, it may be desirable to obtain data from a first storage register so that it can be added to data obtained from a second storage register, with the sum thereof to be inserted for storage into still a third register. If access is not available to the first two registers simultaneously, the data therein must be obtained from each register separately and fed to the computation unit in sequence so that the overall time for making the computation is thereby increased. Accordingly, for high speed data processing systems it becomes necessary to devise methods for obtaining access to different stored data simultaneously to reduce the overall processing time.

Moreover, it is desirable to provide for such simultaneous access in the most reliable and least costly manner possible.

DESCRIPTION OF THE PRIOR ART

In prior art systems, particularly with reference to short term memory apparatus, sometimes referred to as "scratch pad" memory systems, where data is stored for a short time only and where it is desired that access to the short term data be as rapid as possible, separate data selection means (i.e., data "Read" output means) are used to obtain access to the data storage register units. With the advent of integrated circuitry, whether identified as medium scale (MSI) or large scale (LSI), a plurality of data storage registers are formed on a single integrated circuit unit, or chip, and appropriate data selection, or gating, means for providing access to such storage registers are formed on a separate chip. In order to permit simultaneous access to more than one data storage register, it has been necessary to use two separate data selector units which must be appropriately interconnected to each data storage register, each data selector unit thereby providing for separate, but simultaneous, access to two different registers for feeding the data stored therein to an appropriate computation unit.

As the manufacture of such integrated circuitry has become more sophisticated, it has been found possible to provide a plurality of data storage registers together with data selector circuitry on a single integrated circuit unit, so that a single chip is available for permitting access to only one of a plurality of storage registers on the chip at a time. Because of the nature of the formation of such integrated selector and storage register circuitry, it is not possible, however, in large capacity storage and retrieval systems to provide access to more than one of such registers at the same time and, therefore, little or no use has been made at present of integrated selector and storage circuitry for providing simultaneous data access, except in applications wherein the capacity of the system is small and the circuitry involved is simple.

DESCRIPTION OF THE INVENTION

This invention, however, provides for the use of such integrated data selector and storage register circuitry in a manner which permits simultaneous access to the data stored in two or more registers for supplying such data simultaneously to a data processing unit, thereby decreasing the overall processing time of the system.

In accordance with the invention two integrated circuit units each providing integrated data selector and storage register circuitry are utilized, the number of data storage registers in each integrated circuit unit being the same and the storage registers in one unit storing the same information as the corresponding storage registers in the second unit. Each such unit provides access to one of the storage registers therein at a time and the use of both units permits access to the data stored in two different storage registers simultaneously for supplying to a data computation unit.

It has generally been concluded by those in the art that the overall costs of data storage and retrieval systems can be held to a minimum by using the least number of storage registers as possible. In contrast, this invention approaches the problem of costs in a different manner by using two sets of identical storage registers and by so doing provides numerous unexpected advantages over the above described prior art data storage and retrieval systems. Because the invention now makes it possible to take advantage of integrated circuitry on which both storage register and data selector circuitry are formed on the same integrated circuit unit, it is possible to avoid the large number of interconnections required in the prior art systems which utilize only a single set of storage registers and two separate data selector units for access thereto. The avoidance of such a large number of interconnections, as described in more detail below, not only reduces the overall costs considerably but also improves the reliability of the system since it is well known that malfunctions tend to increase with the number of interconnections required between units of an overall system. Moreover, it has been found that the reduction in costs achieved by eliminating the need for such a large number of interconnections in the manufacture of the configuration of the invention far outweighs any increase in costs brought about by the use of two sets of data storage registers.

The invention is described in more detail with reference to the drawing wherein

Figure 1:
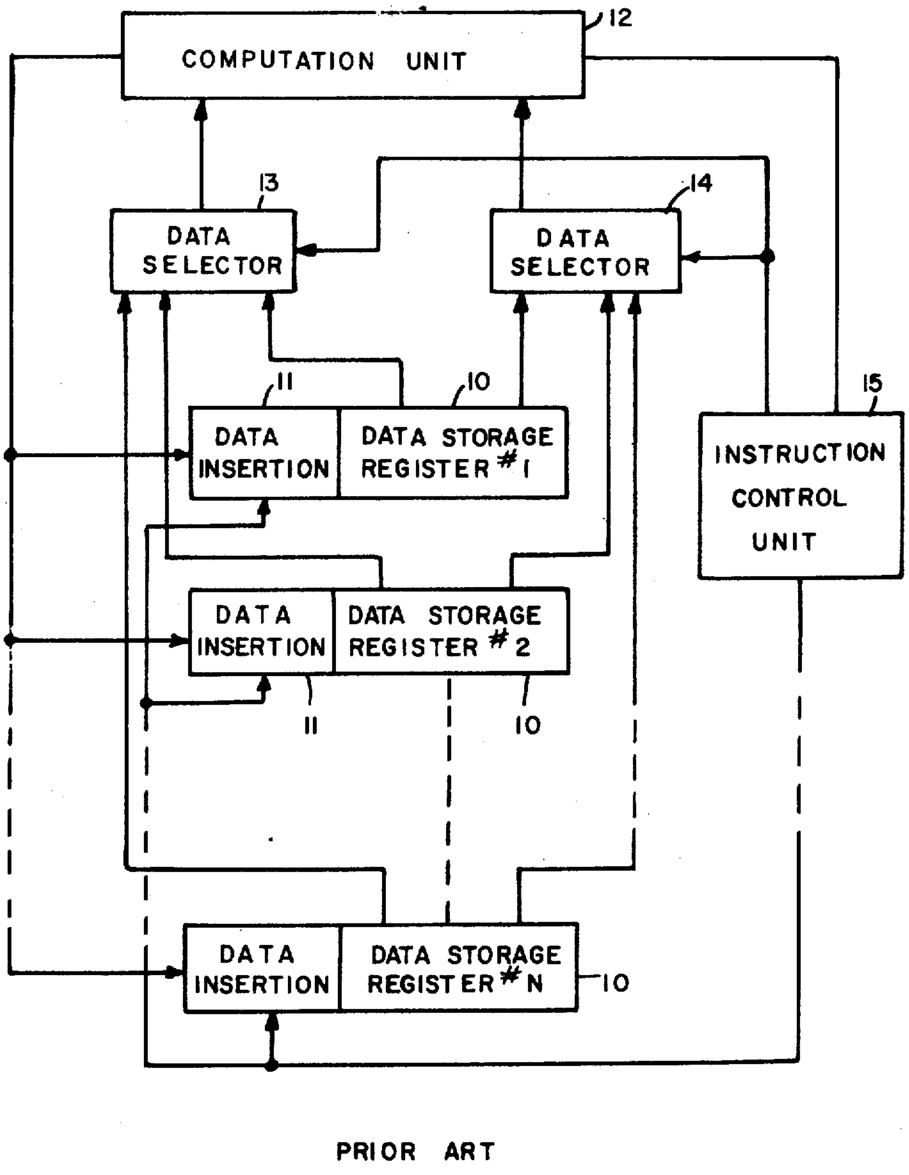
FIG. 1 shows a block diagram of a configuration as used in the prior art.

In conventional prior art systems for providing simultaneous access to data in more than one storage device, such as a storage register, a plurality of separate data storage registers 10 are utilized as shown in FIG. 1. The total number of storage registers which are used depends on the desired capacity of the system. Such registers may all be formed on the same integrated circuit unit or chip, with appropriate data insertion circuitry 11 (i.e. data "Write" circuitry) formed thereon also.

In order to provide simultaneous access to the data in at least two of the data storage registers on such an integrated circuit unit, it was necessary to utilize two separately formed data selector circuits 13 and 14 which must then be suitably interconnected with each of the data storage registers as shown. The interconnecting lines used in the drawing represent a group of lines the number of which depends on the number of data bits stored in each register. For example, if each data storage register is used to store sixteen bits of data then each line therefrom to the data selector units 13 and 14 actually comprises sixteen lines, one for each stored bit. A conventional instruction control unit 15, which, for example, uses an appropriate program for actuating the data storage and retrieval system in conjunction with a computation unit 12, provides the necessary commands for putting the system into operation. Thus, the instruction control unit may be programmed to command a simultaneous selection of data from two different storage registers via instructions fed to data selectors 13 and 14. The data selector, or data access, units thereupon select (i.e. read) the data from the selected storage registers and supply such data simultaneously to the computation unit which then produces computed data which, for example, may then be inserted into third data storage register. Such insertion is also appropriately controlled by instruction control unit 15 so that the data is inserted into the correct data storage register through its appropriate data insertion (i.e. write) circuitry.

Thus, it can be seen that in the prior art systems which provide for simultaneous data access, a single set of data storage register circuits is used together with two separate data selector circuits which, accordingly, must be suitably interconnected therewith in order to provide for appropriate data retrieval. When a relatively large capacity system is used, a relatively large number of interconnecting leads between, and terminals on, the units involved is necessary. The use of such a large number of interconnections leads both to problems in reliability and to increased manufacturing costs.

Moreover, as discussed above, it is not possible in such prior art systems to make use of the latest advances in integrated circuitry in which data selection circuitry is also provided on the same integrated circuit units as the data storage register and data insertion circuitry associated therewith.

Figure 2:
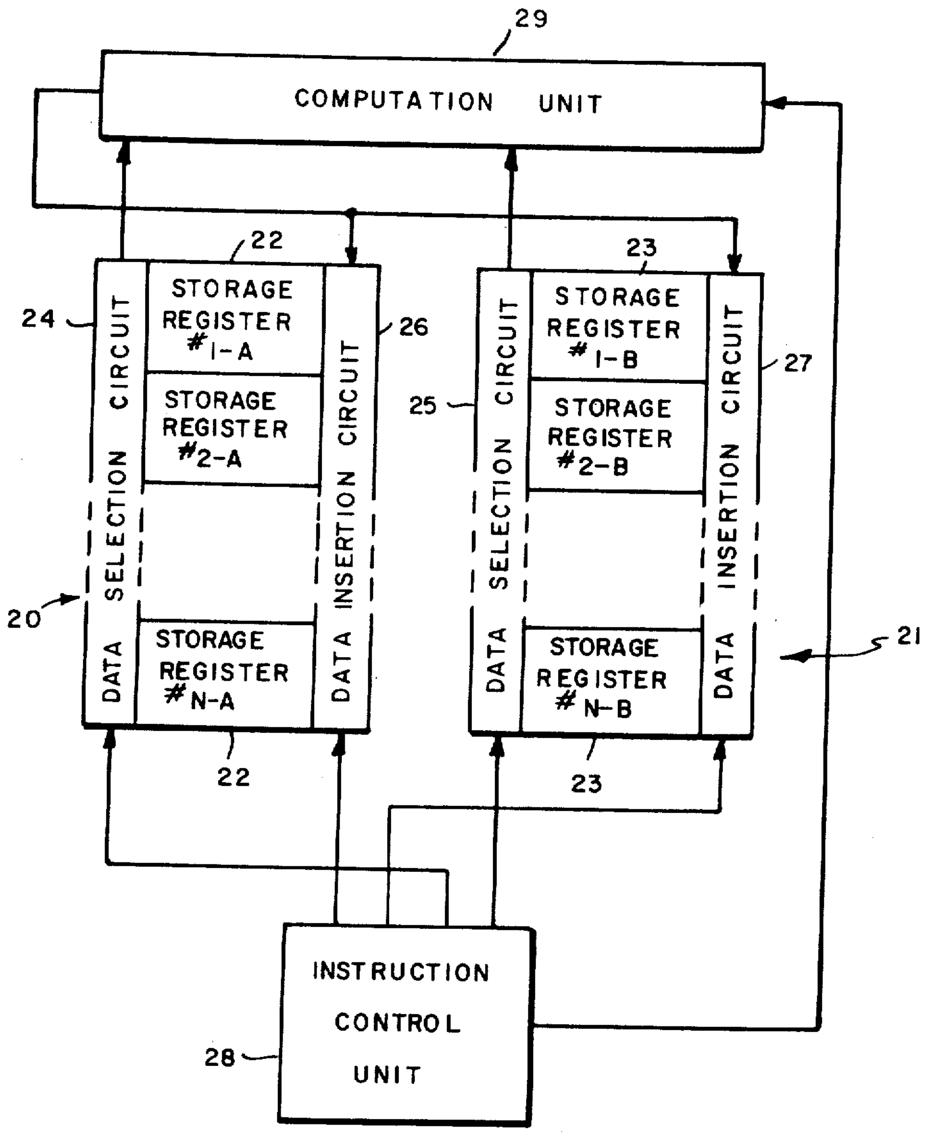
FIG. 2 shows a block diagram of a configuration of the invention.

The invention described herein, however, makes use of such recent advances in integrated circuit manufacture, while simultaneously reducing the overall costs of manufacture and increasing the reliability of operation thereof. The configuration of the invention is shown in the diagram of FIG. 2 wherein there is shown two integrated circuit units 20 and 21 which have formed thereon a plurality of storage registers together with appropriate data selection circuitry and data insertion circuitry. For example, unit 20 has a plurality of storage registers 22 and unit 21 has a plurality of storage registers 23. In each case, the total number of such registers is the same and is determined by the desired capacity of the storage system. Thus integrated circuit unit 20 has N storage registers identified as registers Nos. 1-A, 2-A, . . . N-A and unit 21 has N storage registers identified as registers Nos. 1-B, 2-B, . . . N-B. In each case the integrated circuit unit has appropriate data selection circuitry (i.e. data Read circuitry) 24 and 25, respectively, and appropriate data insertion circuitry (i.e., data Write circuitry) 26 and 27, respectively. An instruction control unit 28 is utilized to provide appropriately programmed command signals to a computation unit 29, to the data selection circuitry of each integrated circuit unit and to the data insertion circuitry of each such unit.

In the system shown in FIG. 2 the data stored in register 1-A is the same as that stored in register 1-B, the data stored in register 2-A is the same as that as stored in register 2-B, and so forth. Each integrated circuit unit is arranged so that its data selection circuitry can select the data from only one storage register at a time. The instruction control unit 28 then appropriately controls the operations thereof so that data selection circuitry 24 of unit 20 obtains the data from a selected storage register of unit 20 and simultaneously data selection circuitry 25 of unit 21 obtains the data from a selected storage register of unit 21. The data which has been so retrieved from each selected register is then supplied simultaneously to computation unit 29 and the appropriate computation made in accordance with the programmed instructions from control unit 28.

As an example of the operation thereof let it be supposed that it is desired to obtain the data from storage register No. 1-A (which is the same as the data stored in register No. 1-B) and add it to the data in storage register 2-B (which is the same as that stored in register 2-A) and, thereafter, to supply the computed sum to still a third storage register 3-A and 3-B (not shown) in each integrated circuit unit 20 and 21, respectively. The instruction control unit provides programmed instructions for providing access to and retrieving the data from storage register 1-A in integrated circuit unit 20 and supplying such data simultaneously with the data retrieved from storage register 2-B to the computation unit 29. The programmed instrunctions from control unit 28 thereupon activate the computation unit to add the data so retrieved and to provide an output sum thereof which is fed to the data insertion circuits 26 and 27 of both integrated circuit units whereupon the instruction control unit provides programmed instructions for inserting such input data into the storage registers 3-A and 3-B.

As can be seen in contrast to the prior art system of FIG. 1, the number of interconnections between the necessary circuits used therein is reduced considerably. Appropriate interconnections are required only from the data selection and data insertion circuits of each integrated circuit unit to the computation unit and from the instruction control unit to the operating circuits of the system. All of the external interconnections, and terminals required therefor, between the data selection circuits and the data storage register circuits of the prior art configuration are eliminated and even though the system uses an additional set of storage register, each containing the same corresponding information, the overall costs and reliability of the system is remarkably improved because of such reduction in wiring interconnections.

Figure 3:
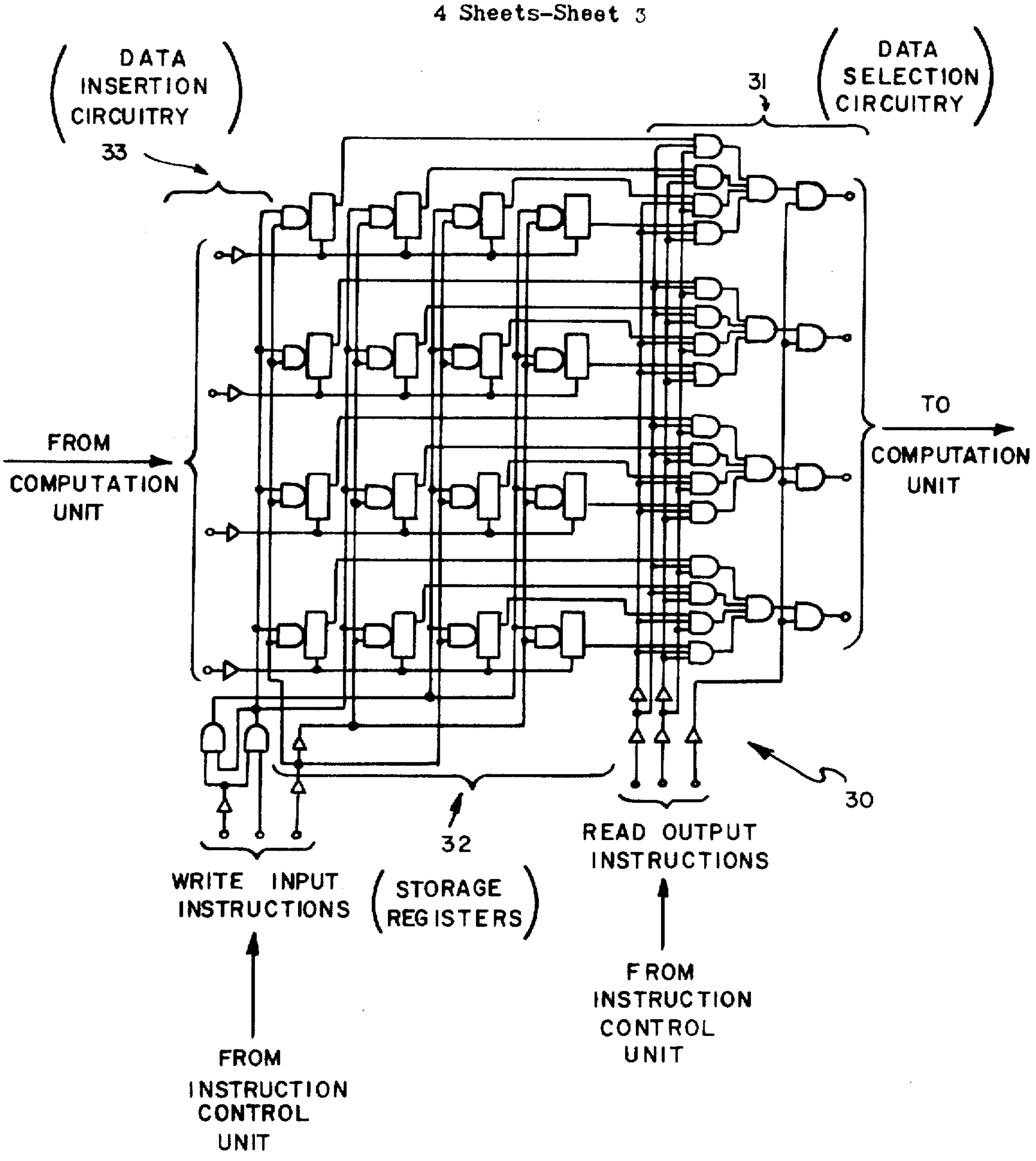
FIG. 3 shows a diagram of exemplary circuitry which can be used in the configuration of FIG. 2.

Specific examples of the type of integrated circuitry which can be utilized in the configuration of the invention are depicted in "The Integrated Circuit Catalog For Design Engineers", First Edition, published by Texas Instruments, Inc. and readily available to those in the art. For example, integrated circuit type SN54170 (SN74170) described therein as a "4 × 4 Register File" is shown in FIG. 3. As seen therein a 4 × 4 matrix of storage devices 32 is formed on the same integrated circuit chip 30 together with appropriate data selection circuitry 31. The output of the data selection circuitry can be supplied to a computation unit and the output from such computation unit can be supplied to the storage registers via appropriate data insertion circuitry 33. An instruction control unit can then supply the appropriate data selection (i.e. Read output) instructions for retrieving the data in a selected storage register and also the appropriate data insertion (i.e. Write input) instructions for storing data in a selected register.

It can be seen that all of the interconnections shown in FIG. 3 are formed on the integrated circuit chip 30 itself and the only external interconnections required are those used for feeding the selected data to and from the computation unit and for feeding the appropriate programmed instructions from an instruction control unit. Two such integrated circuit units are used in the configuration of the invention. The capacity of the storage system may be increased by utilizing a plurality of such 4 × 4 Register Files. For example, in order to achieve a 64-bit capacity in each unit, it is possible to use four of such 4 × 4 units to store either four 16-bit data words or 16 4-bit data words, as desired.

Figure 4:
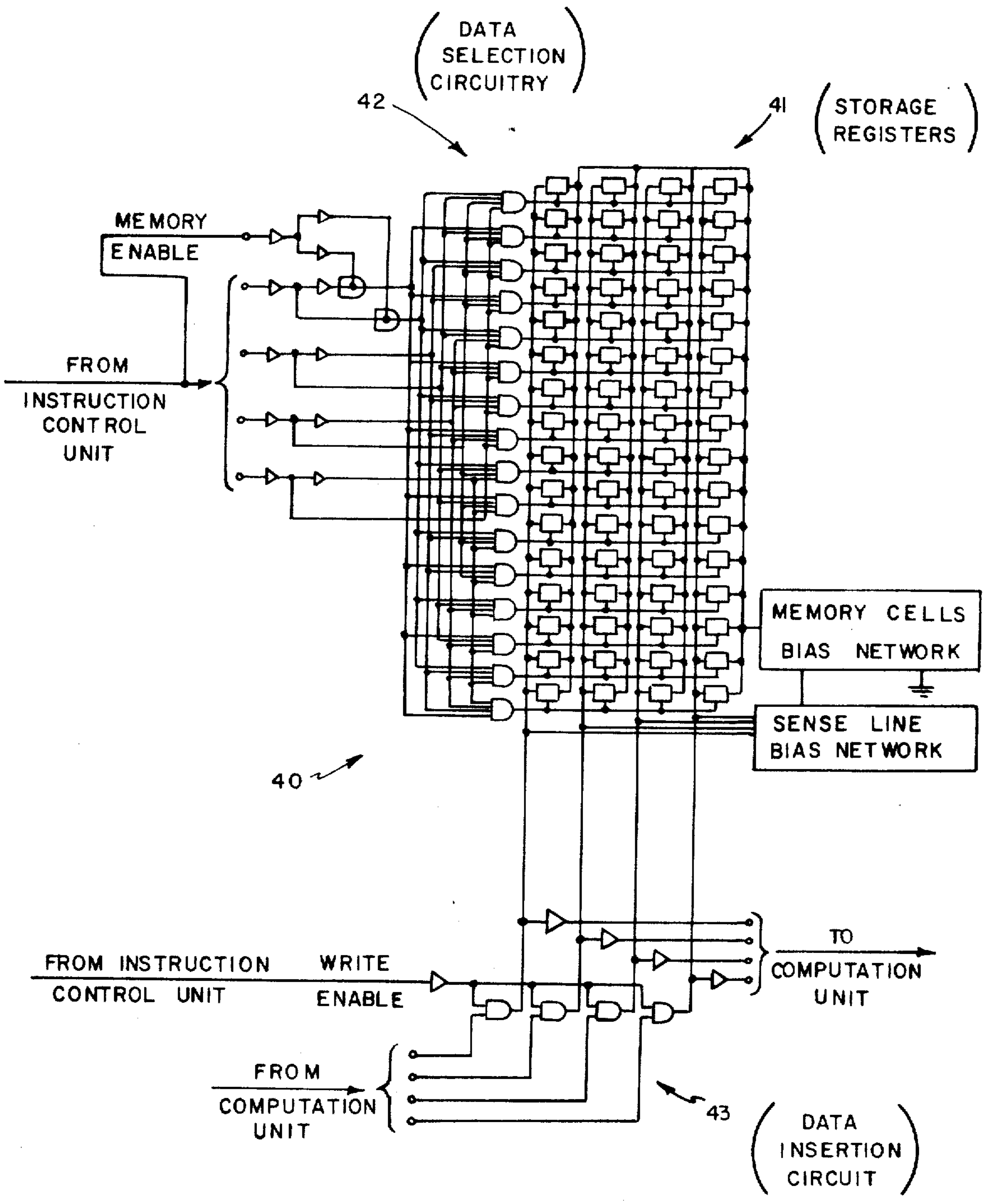
FIG. 4 shows a diagram of alternative exemplary circuitry which can be used in the configuration of FIG. 2.

An alternative integrated circuit unit which can be used in the configuration of the invention is shown in FIG. 4, which is identified as a Texas Instruments circuit type SN7489 64-bit Read/Write Memory Unit. Such unit utilizes a 4 × 16 matrix storage register circuit 41 formed on an integrated circuit chip 40. Appropriate data selection circuitry 42 is formed thereon also to retrieve the desired data, as determined by the instructions thereto from an instruction control unit. The selected data can then appropriately be supplied to a computation unit. Data from the computation unit can be appropriately supplied to the chip and inserted into a selected storage register via suitable data insertion circuitry 43, as determined by instructions from the instruction control unit. Thus. on a single chip it is possible to have a 64-bit capacity Read/Write memory unit, two of such units being used as the integrated circuits of the configuration of the invention as shown in FIG. 2 for providing for simultaneous access to data stored therein. circuit units Other integrated circuit units may be selected by those in the art in order to provide a system which operates in accordance with the principles of the invention and the invention is not to be construed as limited to the specific embodiment described herein except as defined by the appended claims.

What is claimed is:

1. Data storage and retrieval means for providing simultaneous access to data stored in more than one data storage device to make said data available for use, said data storage and retrieval means comprising first means including a plurality of first storage devices for storing data;

first data selection means for providing access to the data in at least a selected one of said first storage devices at one time to make the data from said selected one of said first storage devices available; and at least one additional means, each said additional means including a plurality of additional storage devices for storing data, at least some of said plurality of additional storage devices storing the same data as that stored in at least some of said plurality of first storage devices, additional data selection means operable independently of said first data selection means for providing access to the data in any selected one of said additional storage devices at one time to make the data from said selected one of said additional storage devices available simultaneously with the data from said selected one of said first storage devices; and means for controlling the operations of said first and said additional data selection means whereby the data accessed thereby is simultaneously available for use.

2. A data storage and retrieval means in accordance with claim 1 wherein all of said additional storage devices store the same data as is stored in all of said first storage devices.

3. A data storage and retrieval means in accordance with claim 1 wherein said first means and each of said additional means are integrated circuits.

4. Data storage and retrieval means in accordance with claim 3 wherein there is only one additional integrated circuit means whereby data is supplied simultaneously to said data processing unit from both said integrated circuit means.

5. Data storage and retrieval means in accordance with claim 1 and further including first data insertion means for receiving data and for inserting said data into a selected one of said first storage devices; and additional data insertion means for receiving the same said data and for inserting said data into a selected one of said additional storage devices.

6. Data storage and retrieval means in accordance with claim 5 wherein said controlling means further controls the operations of said first and each said additional data insertion means.

7. Data storage and retrieval means in accordance with claim 5 wherein said first data selection means, said first data insertion means, and said plurality of first storage devices are integrated circuits formed on the same integrated circuit chip and the data selection means, the data insertion means, and the plurality of storage devices of each additional means are integrated circuits formed on the same integrated circuit chip, each of said integrated circuit chips being separate from each other of said integrated circuit chips.

8. Data storage and retrieval means in accordance with claim 7 wherein said first storage devices and each of said plurality of additional storage devices are formed in at least one 4 × 4 matrix configuration.

9. Data storage and retrieval means in accordance with claim 8 wherein said first storage devices and each of said plurality of additional storage devices are formed in a 4 × 16 matrix configuration.

* * * * *